United States Patent
Egami et al.

(10) Patent No.: US 6,261,357 B1
(45) Date of Patent: Jul. 17, 2001

(54) COATING LIQUID FOR FORMING LOW-PERMITTIVITY SILICA FILM AND SUBSTRATE HAVING LOW-PERMITTIVITY COATING FILM

(75) Inventors: Miki Egami; Akira Nakashima; Michio Komatsu, all of Fukuoka (JP)

(73) Assignees: Catalysts & Chemicals Industries Co., Ltd.; Fujitsu Limited, both of (JP)

( * ) Notice: Subject to any disclaimer, the term of this patent is extended or adjusted under 35 U.S.C. 154(b) by 0 days.

(21) Appl. No.: 09/155,234

(22) PCT Filed: Mar. 21, 1997

(86) PCT No.: PCT/JP97/00943

§ 371 Date: Sep. 23, 1998

§ 102(e) Date: Sep. 23, 1998

(87) PCT Pub. No.: WO97/35939

PCT Pub. Date: Feb. 10, 1997

(30) Foreign Application Priority Data

Mar. 25, 1996 (JP) .................................................. 8-094784
Oct. 24, 1996 (JP) .................................................. 8-299684

(51) Int. Cl.[7] .................................................. C09D 183/00
(52) U.S. Cl. .................................. 106/287.1; 106/287.13; 106/287.14; 106/287.15
(58) Field of Search ........................... 106/287.1, 287.13, 106/287.14, 287.15

(56) References Cited

FOREIGN PATENT DOCUMENTS

| | | |
|---|---|---|
| 3537626 | 4/1986 | (DE) . |
| 0768352 | 4/1997 | (EP) . |
| 7-66188 | 3/1995 | (JP) . |
| 8-283661 | 10/1996 | (JP) . |
| 3-263476 | 11/1996 | (JP) . |
| 9600758 | of 0000 | (WO) . |

*Primary Examiner*—David Brunsman
(74) *Attorney, Agent, or Firm*—Webb Ziesenheim Logsdon Orkin & Hanson, P.C.

(57) ABSTRACT

A coating liquid for forming a low-permittivity silica film, which is capable of forming an insulating film that has a relative permittivity as low as up to 3 and is excellent in adherence to a substrate surface, mechanical properties, chemical resistance such as alkali resistance and also crack resistance, and which is capable of smoothing the irregularities of a substrate surface to a satisfactorily high degree, is provided. Further, a substrate comprising this low-permittivity silica coating film is provided.

The coating liquid for forming a low-permittivity silica film comprises a reaction product of fine silica particles with an alkoxysilane represented by the following general formula and/or a halogenated silane represented by the following general formula or a hydrolyzate thereof:

$$X_n Si(OR)_{4-n}$$

$$X_n SiX'_{4-n}$$

wherein X represents hydrogen, fluorine, an alkyl group having 1 to 8 carbon atoms, an aryl group or a vinyl group; R represents hydrogen, an alkyl group having 1 to 8 carbon atoms, an aryl group or a vinyl group; X' represents a halogen atom; and n is an integer of 0 to 3.

20 Claims, No Drawings

COATING LIQUID FOR FORMING LOW-PERMITTIVITY SILICA FILM AND SUBSTRATE HAVING LOW-PERMITTIVITY COATING FILM

This is a 371 of PCT/JP97/00943 filed Mar. 21, 1997.

BACKGROUND OF THE INVENTION

The present invention relates to a coating liquid for forming a low-permittivity silica film, which is capable of forming an insulating film that has a low relative permittivity and has excellent adherence to a substrate surface, has excellent mechanical properties, has excellent chemical resistance such as alkali resistance and also crack resistance, and which is capable of smoothing the irregularities of a substrate surface to a satisfactorily high degree. Further, the present invention relates to a substrate comprising this low-permittivity silica coating film.

Interlayer insulating films are disposed between a semiconductor substrate and a metal wiring layer such as an aluminum wiring layer and between metal wiring layers in order to effect an insulation therebetween in a semiconductor device having multilayer wiring in accordance with an enhanced integration of semiconductor device.

When, for example, a metal wiring layer is disposed on a semiconductor substrate, irregularities occur on the semiconductor substrate by the metal wiring layer. Further disposing a metal wiring layer or the like on the surface with the irregularities may cause wire breakage attributed to the level differences of the irregularities. When the level differences of the irregularities are greater than the range of exposure focal depth of resist for forming fine patterns, fine patterns cannot be obtained. Therefore, it is requisite that surfaces having irregularities attributed to the above interlayer insulating films disposed between a semiconductor substrate and a metal wiring layer, and between metal wiring layers and attributed to various elements, be smoothed to a satisfactorily high degree.

With respect to the structure having the above multilayer wiring, in a semiconductor device of 0.3μ rule or less, the metal wiring spacing is so small that the metal wiring impedance due to electrostatic induction is increased, resulting in a possible delay of response speed and an increase of electric consumption. Therefore, it is requisite that the relative permittivity of the interlayer insulating films disposed between a semiconductor substrate and a metal wiring layer such as an aluminum wiring layer or between metal wiring layers be minimized as much as possible.

The interlayer insulating film used for the above purposes is generally formed on a substrate by the vapor phase growing method such as the plasma CVD method or sputtering method, or the coating method in which an insulating film is formed with the use of a coating liquid for film formation.

However, in the vapor phase growing method such as the plasma CVD method, it is believed that the limit of the relative permittivity of obtained coating film is 3.5 attained by the fluoride doped silica film, and forming a coating film having a relative permittivity of up to 3 is difficult. Although the relative permittivity of the coating film formed with the use of a coating liquid comprising a fluoride doped polyimide resin or a fluororesin is about 2, the coating film has drawbacks in that, for example, the adherences to a substrate surface and to resist material used in fine working are poor and the resistances to chemical and to oxygen plasma are poor.

The conventional coating liquid for forming silica film, comprising a partial hydrolyzate of alkoxysilane, enables obtaining a coating film with a relative permittivity of 2.5 but has a drawback in that the adherence to a substrate surface is poor.

The present invention has been made with a view toward solving the above drawbacks of the prior art. It is a primary object of the present invention to provide a coating liquid for forming a low-permittivity silica film, which is capable of forming an insulating film that has a relative permittivity as low as up to 3 and is excellent in adherence to a substrate surface, has excellent mechanical properties, chemical has resistance such as alkali resistance, and also crack resistance and which is capable of smoothing the irregularities of a substrate surface to a satisfactorily high degree. It is also an object of the present invention to provide a substrate comprising this low-permittivity silica coating film.

SUMMARY OF THE INVENTION

The coating liquid for forming a low-permittivity silica film according to the present invention comprises a reaction product of fine silica particles with an alkoxysilane represented by the following general formula [I] and/or a halogenated silane represented by the following general formula [II] or a hydrolyzate thereof, wherein the fine silica particles are obtained by hydrolyzing at least one alkoxysilane represented by the following general formula [I] at 180° C. or higher, optionally followed by aging at 180° C. or higher:

$$X_n Si(OR)_{4-n} \qquad [I]$$

$$X_n SiX'_{4-n} \qquad [II]$$

wherein X represents hydrogen, fluorine, an alkyl group having 1 to 8 carbon atoms, an aryl group or a vinyl group; R represents hydrogen, an alkyl group having 1 to 8 carbon atoms, an aryl group or a vinyl group; X' represents a halogen atom; and n is an integer of 0 to 3.

Also, the coating liquid for forming a low-permittivity silica film according to the present invention has an ion concentration of less than 1 mmol/lit.

Also, the substrate having a silica coating film according to the present invention comprises a low-permittivity silica coating film formed with the use of the above coating liquid.

DETAILED DESCRIPTION OF THE INVENTION

The coating liquid for forming a low-permittivity silica film will be described in detail below.

Coating Liquid for Forming Low-permittivity Silica Film

The coating liquid for forming a low-permittivity silica film according to the present invention comprises a reaction product of fine silica particles with an alkoxysilane represented by the following general formula [I] and/or a halogenated silane represented by the following general formula [II] or a hydrolyzate thereof:

$$X_n Si(OR)_{4-n} \qquad [I]$$

$$X_n SiX'_{4-n} \qquad [II]$$

wherein X represents hydrogen, fluorine, an alkyl group having 1 to 8 carbon atoms, an aryl group or a vinyl group; R represents hydrogen, an alkyl group having 1 to 8 carbon atoms, an aryl group or a vinyl group; X' represents a halogen atom; and n is an integer of 0 to 3.

Examples of the alkoxysilanes represented by the above formula $X_nSi(OR)_{4-n}$ include tetramethoxysilane, tetraethoxysilane, tetraisopropoxysilane, tetrabutoxysilane, tetraoctylsilane, methyltrimethoxysilane, methyltriethoxysilane, methyltriisopropoxysilane, ethyltrimethoxysilane, ethyltriethoxysilane, ethyltriisopropoxysilane, octyltrimethoxysilane, octyltriethoxysilane, vinyltrimethoxysilane, vinyltriethoxysilane, phenyltrimethoxysilane, phenyltriethoxysilane, trimethoxysilane, triethoxysilane, triisopropoxysilane, fluorotrimethoxysilane, fluorotriethoxysilane, dimethyldimethoxysilane, dimethyldiethoxysilane, diethyldimethoxysilane, diethyldiethoxysilane, dimethoxysilane, diethoxysilane, difluorodimethoxysilane, difluorodiethoxysilane, trifluoromethyltrimethoxysilane and trifluoromethyltriethoxysilane.

Examples of the halogenated silanes represented by the above formula $X_nSiX'_{4-n}$ include trichlorosilane, tribromosilane, fluorotrichlorosilane, methyltribromosilane, ethyltrichlorosilane, vinyltrichlorosilane and phenyltrichlorosilane.

The above coating liquid for forming a low-permittivity silica film can be prepared by, for example, the following process.

First, the fine silica particles can be obtained by subjecting at least one alkoxysilane represented by the above general formula [I] to hydrolysis/polycondensation in the presence of water, an organic solvent and a catalyst. The preparation of the fine silica particles can be performed by the customary process.

Examples of the organic solvents include alcohols, ketones, ethers and esters. Specific examples thereof include alcohols such as methanol, ethanol, propanol and butanol; ketones such as methyl ethyl ketone and methyl isobutyl ketone; glycol ethers such as methyl cellosolve, ethyl cellosolve and propylene glycol monopropyl ether; glycols such as ethylene glycol, propylene glycol and hexylene glycol; and esters such as methyl acetate, ethyl acetate, methyl lactate and ethyl lactate.

A basic compound such as ammonia, an amine, an alkali metal compound, a quaternary ammonium compound or an amine coupling agent can be used as the catalyst.

The process for preparing the fine silica particles will now be described in greater detail. For example, a water/alcohol mixed solvent is agitated, and an alkoxysilane and a basic compound catalyst such as aqueous ammonia are added to the obtained mixed solvent and reacted.

In this process, water is used in an amount of 0.5 to 50 mol, preferably, 1 to 25 mol per mol of the Si—OR group being a constituent of the alkoxysilane. Ammonia is mixed in an amount of, for example, 0.01 to 1 mol/mol of $SiO_2$, preferably, 0.05 to 0.8 mol/mol of $SiO_2$.

The alkoxysilane is preferably hydrolyzed at at 180° C. or higher, still preferably, 200° C. or higher in a pressure vessel such as an autoclave. Further, aging can be conducted thereafter at the same temperature or higher temperatures. The higher the above hydrolyzing temperature and/or aging temperature, the greater the polycondensation of alkoxysilane is promoted and the denser the internal texture of the fine silica particles. In the present invention, when the hydrolyzing and/or aging is conducted at the above temperature, the fine silica particles become more denser, and not only the hygroscopicity of the particles per se is lowered but also the amount of residual functional groups on the particle surface is reduced. Thus, the obtained coating film is one whose relative permittivity does not change with the passage of time and which has excellent heat resistance.

Also, the formation and growth of fine silica particles may be performed by, for example, adding a solvent of high boiling point such as ethylene glycol to a water/alcohol mixed solvent under agitation and hydrolyzing an alkoxysilane. The addition of the above high boiling point solvent prior to the hydrolysis of alkoxysilane induces an ester exchange reaction of alkoxy group, so that the high boiling point solvent is trapped inside the fine silica particles. As a result, porous fine silica particles with a low density can be obtained.

Silica sol obtained by subjecting an alkali metal silicate or the like to a step of an ion exchange, a hydrolysis, etc. can also be used as the fine silica particles. Further, use can be made of fine particles of porous zeolite such as those obtained by removing aluminum from zeolite composed of an aluminosilicate.

The particle size of the fine silica particles for use in the present invention is preferably in the range of 30 to 1000 Å, still preferably, in the range of 50 to 500 Å. As long as the fine particles have a particle size within the above range, use may be made of a mixture of at least two types of fine particles whose particle sizes are different from each other as well as fine particles with uniform particle size. When the particle size is less than 30 Å, it would be difficult to reduce the permittivity of obtained coating film. On the other hand, when the particle size exceeds 1000 Å, defects are likely to occur during fine working in the step of photolithography.

The coating liquid for forming a low-permittivity silica film according to the present invention is obtained by reacting the thus obtained fine silica particles with the above alkoxysilane represented by the general formula [I], halogenated silane represented by the general formula [II] or at least part of a hydrolyzate thereof. In this reaction, use can be made of a mixture of the alkoxysilane and the halogenated silane. The alkoxysilane subjected to reaction with the fine silica particles may be the same as or different from that employed in the preparation of fine silica particles. In this reaction, neither growth of fine silica particles nor formation of new fine silica particles occurs and a surface reaction of the fine silica particles with the alkoxysilane, halogenated silane or hydrolyzate thereof occurs on the surface of the fine silica particles. As a result, the coating liquid capable of providing a low-permittivity silica film exhibiting excellent performance can be obtained.

Although the fine silica particles as prepared may be directly subjected to the reaction, it is preferred that, prior to the reaction, the water/organic solvent as the dispersion medium of the fine silica particles be replaced by an organic solvent alone by means such as ultrafiltration.

Those employed in the above hydrolysis of the alkoxysilane can be mentioned as the organic solvent.

Although the alkoxysilane or halogenated silane reacted with the fine silica particles in the preparation of the above coating liquid may be used without being hydrolyzed in advance, it is preferred that the alkoxysilane or halogenated silane be hydrolyzed in advance by the customary procedure and used in the reaction with the fine particles of silica in the form of a hydrolyzate polymer obtained by the hydrolysis. When this hydrolysis is conducted, aggregation of fine silica particles and gelation thereof are suppressed and it is highly probable obtain a stable coating liquid will be obtained.

When this hydrolysis of the alkoxysilane or halogenated silane is carried out, generally, use is made of water, an organic solvent and a catalyst. The organic solvent is, for example, selected from among those set forth hereinbefore. The catalyst is, for example, selected from among those set forth hereinbefore plus acid catalysts. Examples of the acid catalysts include inorganic acids such as hydrochloric acid, nitric acid and sulfuric acid, organic acids such as acetic acid, oxalic acid and toluenesulfonic acid, and compounds exhibiting an acidity in an aqueous solution, e.g., metallic soap. Of the catalysts, acid catalysts are preferred.

Water is generally used in an amount of 0.1 to 5 mol, preferably, 0.1 to 2 mol per mol of the Si—OR group being a constituent of the alkoxysilane or the Si—X' group being a constituent of the halogenated silane. The catalyst is generally added in an amount of 0.001 to 1 mol per mol of the alkoxysilane or halogenated silane.

The number average molecular weight of the hydrolyzate obtained by the hydrolysis conducted under the above conditions preferably ranges from 100 to 50,000, still preferably, from 500 to 10,000 (molecular weight in terms of polystyrene).

The coating liquid for forming a low-permittivity silica film according to the present invention is obtained by mixing the above obtained fine silica particles with the alkoxysilane, halogenated silane or hydrolyzate thereof and reacting them. Their mixing ratio is such that the above hydrolyzate is present in an amount sufficient to allow at least part of the silica particle surface to couple with the hydrolyzate.

In the present invention, each of the alkoxysilane and halogenated silane hydrolyzates is preferably mixed with the fine silica particles in an amount of at least 0.01 part by weight, still preferably, at least 0.02 part by weight in terms of $SiO_2$ per part by weight of fine silica particles.

When the amount of alkoxysilane or halogenated silane hydrolyzate is less than 0.01 part by weight, the obtained silica coating film becomes a porous body containing plenty of intergranular voids of fine silica particles. Although its permittivity lowering is promising, the silica coating film is inferior in adherence to a substrate surface, mechanical properties, chemical resistance such as alkali resistance and crack resistance, and the substrate surface flattening capability of the silica coating film tends to deteriorate. Moreover, the above alkoxysilane and halogenated silane hydrolyzates can function as a binder for coating film formation, so that unreacted hydrolyzates may be present in the coating liquid. However, when the amount of these is too large, the intergranular voids of fine silica particles in the obtained coating film are filled by the hydrolyzates with the result that the lowering of the permittivity of the coating film cannot be expected. Therefore, it is preferred that the amount of the above hydrolyzate be less than 10 parts by weight, especially, less than 1 part by weight per part by weight of fine particles of silica.

After the above mixing of the fine silica particles with the alkoxysilane or halogenated silane hydrolyzate, the mixture is heated at about 100° C. or below, preferably, 80° C. or below. The heating is generally conducted for a period of 0.5 to 5 hr, preferably, 0.5 to 3 hr depending on the temperature and other conditions.

This heating treatment enables obtaining the coating liquid for forming a low-permittivity silica film according to the present invention, in which at least part of the silica particle surface is bound with the alkoxysilane or halogenated silane hydrolyzate.

Silica coating film prepared from the above coating liquid has excellent properties. For example, no peak ascribed to an OH group is observed on an FT-IR spectrum of a coating film obtained by sintering the thus obtained silica coating film at 450° C. in nitrogen even after it has been allowed to stand still at ordinary temperature for one week. Thus, re-adsorption of moisture which is a serious factor for increasing permittivity is not recognized.

Furthermore, the alkoxysilane or halogenated silane hydrolyzate may be added to the coating liquid having been prepared by the above process. In that instance as well, it is preferred that the amount of hydrolyzate fall within the range as mentioned hereinbefore.

The ion concentration of the coating liquid for forming a low-permittivity silica film according to the present invention is preferably less than 1.0 mmol/lit., still preferably, not greater than 0.5 mmol/lit. When the ion concentration exceeds 1.0 mmol/lit., the surface reactivity of the fine silica particles is influenced by ions, thereby rendering the surface treatment of fine silica particles unsatisfactory. Thus, the flattening of a substrate surface may be deteriorated, and re-adsorption of water onto the coating film is likely to occur.

Not only are the above problems solved but also the coating film having substantially no voids and pinholes and with improved adherence to a substrate surface improved, improved mechanical strength, chemical resistance, moisture resistance and improved insulating properties can be obtained by lowering the ion concentration of the coating liquid.

The terminology "ion concentration" as used herein means the total concentration of cations and anions which are present in the coating liquid. The ion concentration is measured by the following method. That is, metal ions of the cations are measured by the atomic absorption method, and ammonium ions and anions are measured by the ion chromatography method.

The coating liquid with the above low ion concentration can be produced by performing treatment with the use of a cation exchange resin or an anion exchange resin at any of the steps of the coating liquid producing process. For example, use is made of the method in which a dispersion of fine silica particles is first deionized and then mixed with the alkoxysilane or halogenated silane hydrolyzate or the method in which their mixing is first conducted and then a deionization follows.

The above deionization treatment may be performed either by separately conducting treatment through a cation exchange resin and treatment through an anion exchange resin or by treating with the use of a mixture of both resins.

Substrate with Low-permittivity Silica Coating Film

The coated substrate of the present invention is obtained by applying the thus obtained coating liquid for forming a low-permittivity silica film to a surface of each of various substrates, followed by heating.

This application method can be conducted by the use of common coating technique such as the spray method, spin coat method, dipping method, roll coater method or transfer method. The heating after the application is generally conducted at 300 to 450° C., preferably, 350 to 400° C. This heating is preferably conducted in an atmosphere of inert gas such as nitrogen. As a result, a coating film with a lower relative permittivity can be obtained.

When, as mentioned above, the heating is conducted after the application of the coating liquid to the substrate and the drying, the polymerization of the film forming component of the coating liquid is advanced so that the film forming component is cured. During the heating, the melt viscosity of the polymer is lowered to thereby increase the reflowability of the coating film with the result that the flatness of the obtained coating film is increased. When the coating film is formed from the coating liquid for forming silica film according to the present invention, the heating lowers the melt viscosity of the polymer so that the reflowability owing to low melt viscosity is maintained to a temperature of about 400° C. Therefore, the coating film having enhanced flatness can be obtained.

Although the thickness of the thus formed low-permittivity silica coating film is varied depending on the substrate on which the coating film is formed, the purpose thereof, etc., for example, a coating film disposed on a silicon substrate of a semiconductor device generally has a thickness of about 1000 to 2500 Å and an insulating film disposed between multiple wiring layers generally has a thickness of about 3000 to 5000 Å.

The substrate with a low-permittivity silica coating film according to the present invention may be applied in, for example, a semiconductor device, a liquid crystal display or a photomask with phase shifter. In particular, with respect to the semiconductor device, the above low-permittivity coating film is formed, for example, on a silicon substrate, between wiring layers of a multilayer wiring structure, on an element surface or on a part of PN junction.

The coating liquid according to the present invention is capable of forming on a substrate the silica film that has a relative permittivity as low as up to 3 and that is excellent in its adherence to the substrate surface, mechanical properties, chemical resistance and crack resistance, and is further capable of smoothing the irregularities of the substrate surface to a satisfactorily high degree.

That is, when the silica coating film is formed from the coating liquid according to the present invention, the coating film is rendered to be porous by intergranular voids between fine silica particles contained as a film forming component with the result that the obtained coating film has a permittivity lower than that of conventional SOG film. Moreover, the alkoxysilane or halogenated silane hydrolyzate bound with the surface of the fine particles has an effect of preventing re-adsorption of water onto the above intergranular voids and, further, the hygroscopicity of the fine particles per se is reduced by high-temperature aging of the fine silica particles, so that the obtained coating film exhibits a stable low relative permittivity which does not change irrespective of the passage of time. Furthermore, residual organic groups on the surface of the fine silica particles are so few that the coating film has excellent heat resistance. Still further, the adherence thereof to a substrate surface is enhanced by the anchor effect of the fine silica particles.

The substrate with a low-permittivity silica coating film according to the present invention has coating film whose relative permittivity is as low as up to 3 and which is excellent in the adherence to its surface, mechanical properties, chemical resistance, crack resistance and heat resistance, and further the irregularities of its surface are smoothed to a satisfactorily high degree. Further, this substrate has a coating film which is stable with an excellent relative permittivity scarcely changing over a long period of time.

The present invention will now be illustrated with reference to the following Examples, which in no way limit the scope of the invention.

EXAMPLES 1 to 6
and

Comparative Examples 1 and 2

1. Preparation of Fine Silica Particles

A solution consisting of a mixture of 139.1 g of pure water and 169.9 g of methanol was maintained at 60° C. 2982.5 g of a water/methanol solution of tetraethoxysilane (ethyl silicate 28 produced by Tama Kagaku Kogyo, 532.5 g of tetraethoxysilane added to 2450 g of a 2:8 weight ratio mixture of water and methanol) and 596.4 g of 0.25% aqueous ammonia were simultaneously added thereto over a period of 52 hr. After the completion of the addition, the mixture was aged at the above temperature for 3 hr. Thereafter, unreacted tetraethoxysilane, methanol and ammonia were removed by the ultrafiltration method, followed by treatment with amphoteric ion exchange resin (AG-501 produced by Bio-Rad) so that the impurity ion concentration became 0.5 mmol/lit. Thus, a dispersion of fine silica particles (A) having an average particle size of 300 Å was obtained.

The above dispersion (A) was aged at 300° C. for 3 hr by means of an autoclave. Thus, a dispersion of fine silica particles (B) having an average particle size of 250 Å was obtained.

Dispersion of fine silica particles was prepared under the same conditions as in the above preparation of the dispersion of fine silica particles (A), except that use was made of a solution consisting of a mixture of 139.1 g of pure water, 140 g of methanol and 29.9 g of ethylene glycol. The resultant dispersion was aged at 300° C. for 3 hr by means of an autoclave. Thus, a dispersion of fine particles of porous silica (C) having an impurity ion concentration of 0.4 mmol/lit. and an average particle size of 250 Å was obtained.

With respect to the ion concentration, the metal ion concentration was measured by the atomic absorption method, and the ammonium and anion concentrations were measured by the ion chromatography method.

2. Preparation of Alkoxysilane and Halogenated Silane Hydrolyzates 250 g of triethoxysilane was mixed with 750 g of methyl isobutyl ketone, and 1000 g of a 0.01% by weight hydrochloric acid aqueous solution was added thereto. A reaction was carried out at 50° C. for 1 hr under agitation. The reaction mixture was allowed to stand still, and an upper layer of methyl isobutyl ketone solution was fractionated. Thus, hydrolyzate (A) was obtained.

Hydrosilsesquioxane (HSQ, produced by Dow Corning) being a hydrolyzate of trichlorosilane was dissolved in methyl isobutyl ketone so that the silica concentration became 10% by weight. Thus, hydrolyzate (B) was obtained.

3. Preparation of Coating Liquid for Film Formation

Water and alcohol were distilled off from the above obtained dispersion of fine silica particles by means of a rotary evaporator, and methyl isobutyl ketone was introduced to thereby effect a solvent replacement. The resultant dispersion and the above obtained alkoxysilane and halogenated silane hydrolyzates were mixed together in given proportion and heated at 50° C. for 1 hr. Thereafter, a second solvent replacement with methyl isobutyl ketone was carried out by means of the rotary evaporator. Alcohol and water formed by the heating treatment were completely removed, thereby obtaining film forming coating liquids C-1 to C-8 listed in Table 1, which had a silica concentration of 20% by weight.

4. Semiconductor Device with Silica Coating Film

Each of the coating liquids for film formation C-1 to C-8 was applied onto a semiconductor substrate with minimum 0.25μ rule metal wiring by the spin coat method and dried at 250° C. for 3 min. Thereafter, sintering was carried out at 450° C. for 30 min in nitrogen to thereby form a silica coating film. All the resultant silica coating films had a thickness of 5000 Å.

Upper-layer metal wiring was formed on each of the coating films, thereby completing a semiconductor device.

The flattening performance and relative permittivity of the silica coating film of each of the thus obtained semiconductor devices were measured.

The relative permittivity was measured not only immediately after the formation of coating film but also after the passage of one week.

The results are given in Table 2.

In Table 2, $\epsilon_1$ represents the relative permittivity immediately after the formation of coating film upon sintering in nitrogen atmosphere and $\epsilon_2$ represents the relative permittivity of coating film after the passage of one week.

The flatness was evaluated by observing a section of substrate after the formation of coating film by means of an SEM electron microscope, and the relative permittivity was measured by the mercury probe method.

Comparative Examples 3 and 4

The respective silica concentrations of the above hydrolyzates (A) and (B) adjusted to 20% by weight, thereby obtaining coating liquids. Silica coating films were prepared therefrom in the same manner as above and subjected to the same evaluation. Results are given in Table 2.

It is apparent from the results of Table 2 that the silica coating films obtained from the coating liquids for forming silica film according to the present invention have low relative permittivity and are excellent in flatness. Further, it is apparent that the coating films formed from the coating liquids containing fine silica particles aged at high temperature (C-3 to C-8) exhibit substantially no change in relative permittivity even after the passage of one week and have excellent hygroscopicity. By contrast, the silica coating films formed from the coating liquids respectively composed of the hydrolyzates (A) and (B) only have poor hygroscopicity.

TABLE 1

| Coating liq. | Fine silica particles (a) | Hydrolyzate (b) | wt. ratio (a/b) |
|---|---|---|---|
| C-1 | A | A | 8/2 |
| C-2 | A | B | 8/2 |
| C-3 | B | A | 8/2 |
| C-4 | B | B | 8/2 |
| C-5 | B | A | 95/5 |
| C-6 | B | B | 95/5 |
| C-7 | C | A | 7/3 |
| C-8 | C | B | 7/3 |

TABLE 2

|  | Coating liq. | Flatness | $\epsilon 1$ | $\epsilon 2$ |
|---|---|---|---|---|
| Comp. Ex. 1 | C-1 | good | 2.8 | 4.1 |
| Comp. Ex. 2 | C-2 | good | 2.5 | 3.8 |
| Example 1 | C-3 | good | 2.4 | 2.5 |
| Example 2 | C-4 | good | 2.1 | 2.2 |
| Example 3 | C-5 | good | 2.3 | 2.4 |
| Example 4 | C-6 | good | 2.0 | 2.1 |
| Example 5 | C-7 | good | 2.6 | 2.8 |
| Example 6 | C-8 | good | 2.2 | 2.4 |
| Comp. Ex. 3 | (A) | good | 2.9 | 7.0 |
| Comp. Ex. 4 | (B) | good | 2.8 | 5.8 |

What is claimed is:

1. A coating liquid for forming a low-permittivity silica film, comprising a reaction product of fine silica particles with a halogenated silane represented by the following general formula [II] or a hydrolyzate thereof:

$$X_nSiX'_{4-n} \quad [II]$$

wherein X represents hydrogen, fluorine, an alkyl group having 1 to 8 carbon atoms, an aryl group or a vinyl group; X' represents a halogen atom; and n is an integer of 0 to 3.

2. The coating liquid for forming a low-permittivity silica film as claimed in claim 1, wherein the fine silica particles are obtained by hydrolyzing at least one alkoxysilane represented by the above general formula [I], optionally followed by aging.

$$X_nSi(OR)_{4-n}$$

wherein X represents hydrogen, fluorine, an alkyl group having 1 to 8 carbon atoms, an aryl group or a vinyl group; R represents halogen, an alkyl group having 1 to 8 carbon atoms, an aryl group or a vinyl group; and n is an integer of 0 to 3.

3. The coating liquid for forming a low-permittivity silica film as claimed in claim 2, wherein the hydrolyzing or aging temperature is 180° C. or higher.

4. The coating liquid for forming a low-permittivity silica film as claimed in claim 3, which has an ion concentration of less than 1 mmol/lit.

5. A substrate comprising a low-permittivity silica coating film formed from the coating liquid as claimed in claim 3.

6. The coating liquid for forming a low-permittivity silica film as claimed in claim 2, which has an ion concentration of less than 1 mmol/lit.

7. A substrate comprising a low-permittivity silica coating film formed from the coating liquid as claimed in claim 2.

8. The coating liquid for forming a low-permittivity silica film as claimed in claim 1, which has an ion concentration of less than 1 mmol/lit.

9. A substrate comprising a low-permittivity silica coating film formed from the coating liquid as claimed in claim 8.

10. A substrate comprising a low-permittivity silica coating film formed from the coating liquid as claimed in claim 1.

11. A coating liquid for forming a low-permittivity silica film, comprising a reaction product of fine silica particles with a halogenated silane represented by the following general formula [II] or a hydrolyzate thereof and an alkoxysilane represented by the following general formula [I] or a hydrolyzate thereof:

$$X_nSi(OR)_{4-n} \quad [I]$$

$$H_nSiX^1_{4-n} \quad [II]$$

wherein X represents hydrogen, fluorine, an alkyl group having 1 to 8 carbon atoms, an aryl group or a vinyl group; R represents hydrogen, an alkyl group having 1 to 8 carbon atoms, an aryl group or a vinyl group; $X^1$ represents a halogen atom; and n is an integer of 0 to 3.

12. The coating liquid for forming a low-permittivity silica film as claimed in claim 11, wherein the fine silica particles are obtained by hydrolyzing at least one alkoxysilane represented by the above general formula [I], optionally followed by aging.

13. The coating liquid for forming a low-permittivity silica film as claimed in claim 12, which has an ion concentration of less than 1 mmol/lit.

14. A substrate comprising a low-permittivity silica coating film formed from the coating liquid as claimed in claim 12.

15. The coating liquid for forming a low-permittivity silica film as claimed in claim 11, wherein the hydrolyzing or aging temperature is 180° C. or higher.

16. The coating liquid for forming a low-permittivity silica film as claimed in claim 15, which has an ion concentration of less than 1 mmol/lit.

17. A substrate comprising a low-permittivity silica coating film formed from the coating liquid as claimed in claim 15.

18. The coating liquid for forming a low-permittivity silica film as claimed in claim 11, which has an ion concentration of less than 1 mmol/lit.

19. A substrate comprising a low-permittivity silica coating film formed from the coating liquid as claimed in claim 18.

20. A substrate comprising a low-permittivity silica coating film formed from the coating liquid as claimed in claim 11.

* * * * *

UNITED STATES PATENT AND TRADEMARK OFFICE
CERTIFICATE OF CORRECTION

PATENT NO. : 6,261,357 B1
DATED : July 17, 2001
INVENTOR(S) : Miki Egami et al.

It is certified that error appears in the above-identified patent and that said Letters Patent is hereby corrected as shown below:

Column 2,
Line 12, "chemical has" should read -- has chemical --.

Column 3,
Line 62, after "become" delete "more".

Column 4,
Line 61, "probable obtain" should read -- probable that --.

Column 6,
Line 12, after "substrate surface" delete "improved".
Line 13, "chemical resistance" should read -- improved chemical resistsance --.
Lines 13 and 14, "moisture resistance" should read -- improved moisture resistance --.

Column 8,
Line 67, after "(B)" insert -- were --.

Column 10, claim 11,
Line 27, Formula II, "$H_nSiX^1{}_{4-n}$" should read -- $H_nSiX'{}_{4-n}$ --.
Line 32, "$X^1$" should read -- $X'$ --.

Signed and Sealed this

Ninth Day of April, 2002

Attest:

Attesting Officer

JAMES E. ROGAN
Director of the United States Patent and Trademark Office